R. GOOD, Jr.
APPARATUS FOR DELIVERING GLASS FROM FURNACES OR THE LIKE.
APPLICATION FILED SEPT. 2, 1911. RENEWED NOV. 1, 1917.
1,269,597.
Patented June 18, 1918.
3 SHEETS—SHEET 1.
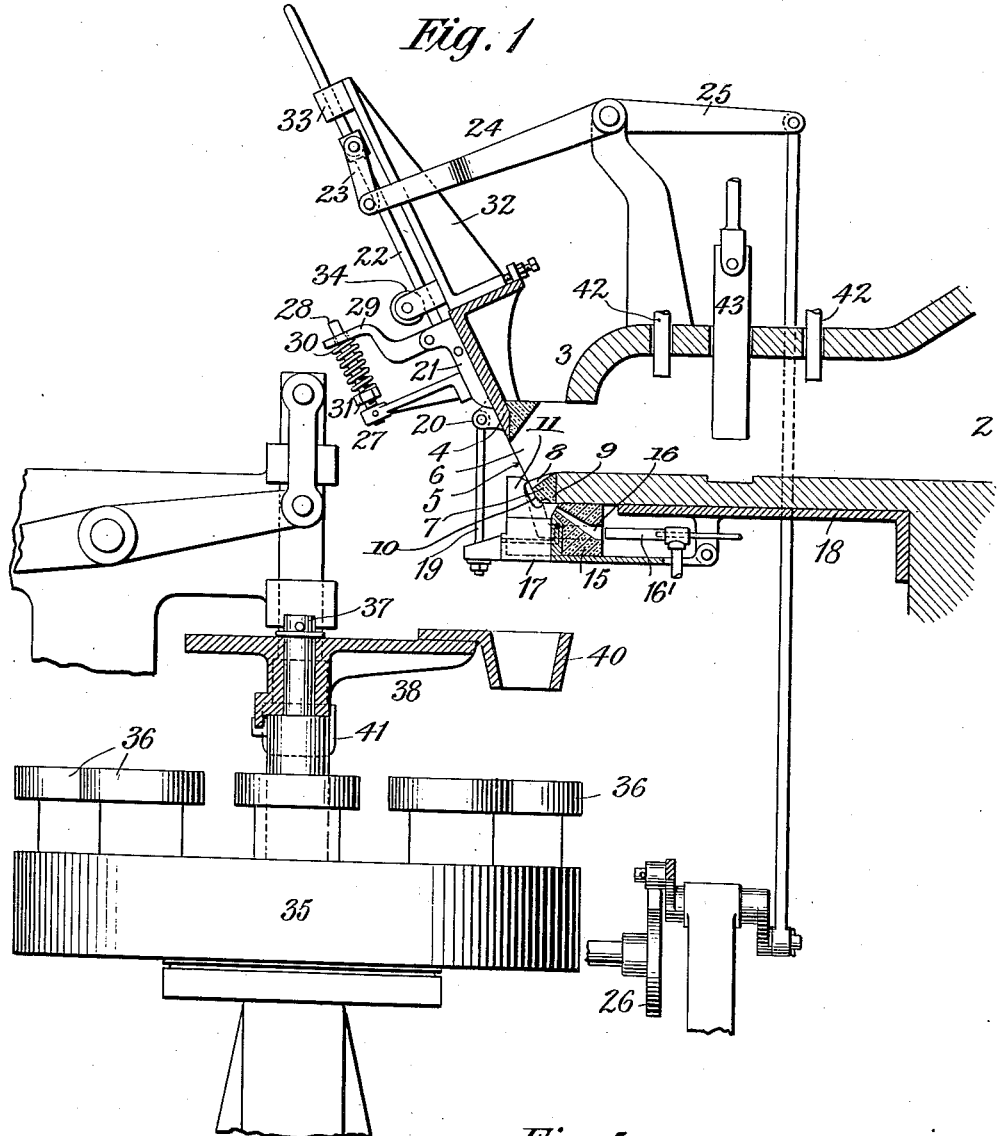
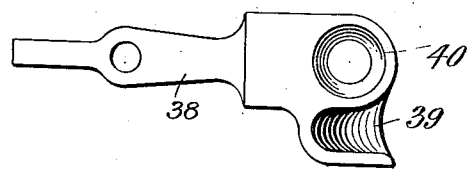

R. GOOD, Jr.
APPARATUS FOR DELIVERING GLASS FROM FURNACES OR THE LIKE.
APPLICATION FILED SEPT. 2, 1911. RENEWED NOV. 1, 1917.

1,269,597.

Patented June 18, 1918.
3 SHEETS—SHEET 2.

R. GOOD, Jr.
APPARATUS FOR DELIVERING GLASS FROM FURNACES OR THE LIKE.
APPLICATION FILED SEPT. 2, 1911. RENEWED NOV. 1, 1917.
1,269,597.
Patented June 18, 1918.
3 SHEETS—SHEET 3.
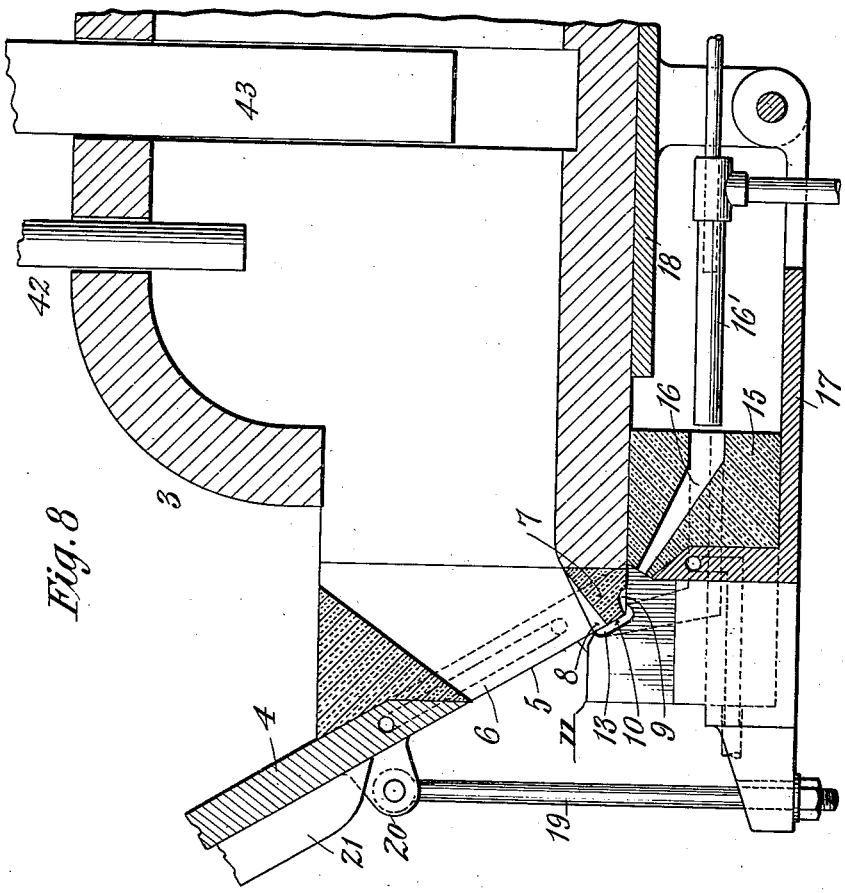
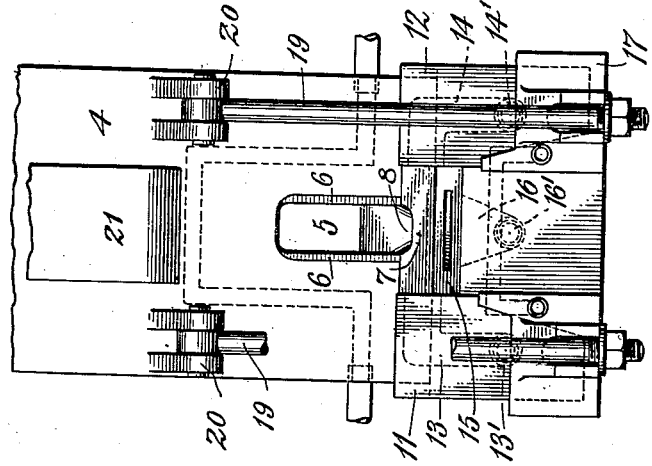

UNITED STATES PATENT OFFICE.

ROBERT GOOD, JR., OF WASHINGTON, PENNSYLVANIA.

APPARATUS FOR DELIVERING GLASS FROM FURNACES OR THE LIKE.

1,269,597.  Specification of Letters Patent.  Patented June 18, 1918.

Application filed September 2, 1911, Serial No. 647,333. Renewed November 1, 1917. Serial No. 199,774.

*To all whom it may concern:*

Be it known that I, ROBERT GOOD, Jr., a citizen of the United States, and a resident of Washington, county of Washington and State of Pennsylvania, have invented a new and useful Improvement in Apparatus for Delivering Glass from Furnaces or the like, of which the following is a specification, reference being had to the accompanying drawings, in which—

Figure 2:
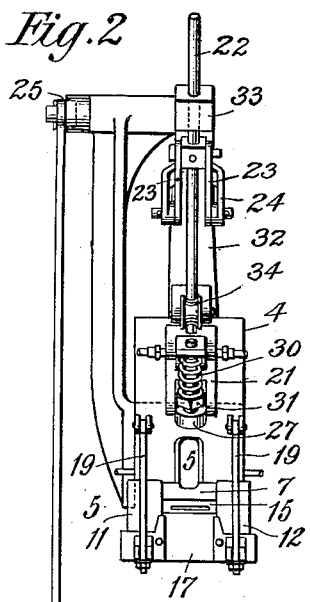
Figure 3:
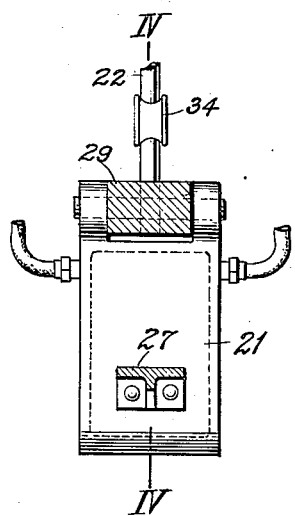
Figure 4:
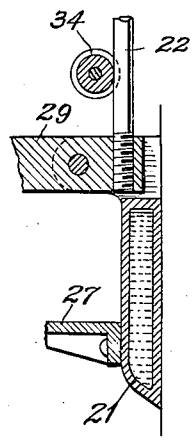
Figure 6:
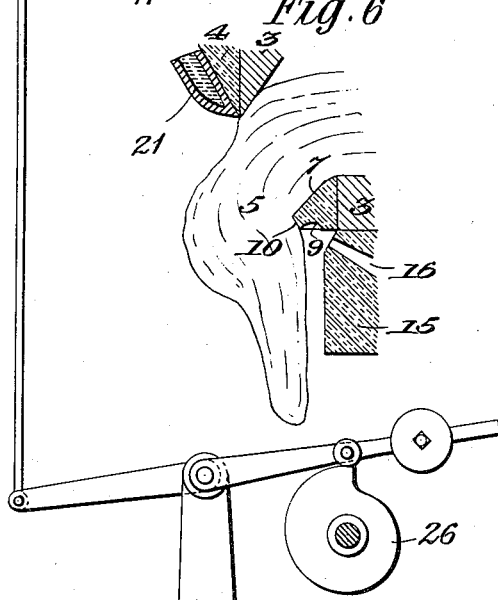
Figure 7:
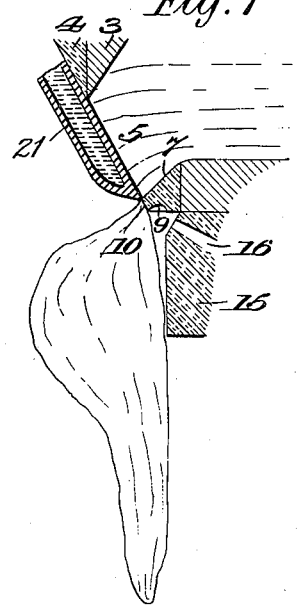

Figure 1 is an elevation partly in section of my device; Fig. 2 is a front elevation of the delivery mechanism, Fig. 3 is an enlarged detail view of the cut-off mechanism, and Fig. 4 is a section on lines IV—IV of Fig. 3. Fig. 5 is a plan of the guide for the glass. Figs. 6 and 7 are details showing the operation of the cut-off mechanism, and Figs. 8 and 9 are details of the delivery mechanism.

My invention relates to the automatic delivery of glass from a furnace, tank, or the like, and is designed to deliver the glass into molds or other receptacles in such quantities as may be desired. I accomplish this by locating a gate or cut-off mechanism at the delivery spout by which I am enabled to cut off charges of glass of any desired weight, and to deliver them into suitable receptacles. By my peculiar construction of gate and delivery spout, I can tap the molten glass directly into the molds without the interposition of any supplementary reservoir, or the use of a continuous stream of glass flowing from the furnace, or the use of punty or gathering irons.

Referring to the drawings, 2 is the furnace and 3 the furnace spout through which the glass is delivered. The spout 3 has a face plate 4, preferably made of cast iron and water cooled, which has an aperture 5 or flow opening therein. This flow opening 5 has clay side faces 6, and a clay cutting sill 7. These parts may be said to form a spout extension or mouth. The cutting sill 7 is channeled out at 8, in order to assist the flow of glass. The sill 7 is recessed on its underside at 9 adjacent to the cutting face 10, in order to prevent the glass from adhering to the lower edge of the sill. The sill 7 rests on the burner blocks 11 and 12, which contain flues 13 and 14 connected with the burners 13' and 14'. Between the burner blocks 11 and 12 is positioned the burner block 15, which contains a flue 16 connected with the burner 16'. The burner mouths of the flues 13' and 14' respectively, are of such shape that they throw jets of flame across the cutting face 10 of the sill 7, and the flue 16 throws a jet against the lower edge of the sill, the three jets enveloping the cutting face and the lower edge of the sill 7 in flame. The burner blocks 11, 12 and 15 are carried by the burner case 17, which is pivotally supported at its rear end by the cast iron casing 18, which forms a support for the spout 3, and at its front end by the bolts 19 depending from the lugs 20 of the face plate 4.

21 is a cutting knife or gate which severs the glass passing through the aperture 5. The cutting gate 21 is pivotally connected to the rod 22 which is actuated through the links 23, the yoke 24, and the levers 25 by the cam 26. The cutting gate 21 is preferably water cooled. To its back face is secured the extending arm 27 to the outer end of which is securely connected the stud 28, one end of which works loosely through the slot in the bell-crank extension 29 of the rod 22. Upon the stud 28 is positioned a spring 30, and the spring is held against the extension 29 by the adjusting nut 31. By this means the pressure of the cutting edge of the gate 21 against the face plate 4, the faces 6 and sill 7 can be regulated. Mounted on the extension 32 of the face plate 4 are the guides 33 and 34 through which the rod 22 reciprocates.

The mold table 35 which I have shown is of ordinary character and has molds or receptacles 36 for the glass, mounted thereon, and is operated counter clockwise. Upon the shaft 37 of the mold table 35 is mounted a stationary guide 38 for the glass flowing from the furnace. This guide 38 has two pockets 39 and 40. 39 is a deflecting pocket by which when desired the glass may be deflected over the edge of the table onto the floor. This pocket 39 is designed for use preparatory to starting up my device, or in case it is desired to stop the plunger or the mold table. The pocket 40 acts as a guide for the glass when the device is in operation and prevents any portions of the cut-off quantities of glass from falling over the edge of the receiving mold. 41 is the plunger which is so positioned that each glass filled mold 36 is operated upon almost immediately after it is filled. The cam 26 which drives cut-off knife 21, the mold table 35, and the plunger 41, may be operated by any suitable means.

I prefer to keep the glass in the discharge spout 3 hot by means of gas jets 42. 43 is a regulating gate adapted to prevent the flow of glass from the furnace when my device is not in use, or to regulate the amount of glass passing out of the furnace when it is in use.

The operation of the device is as follows:

The device is started by turning on the gas jets 42 which heat the glass which has become chilled in the discharge spout 3. The gate 43 is then raised and the glass allowed to flow through the aperture 5 in the face plate 4. Simultaneously with turning on the jets 42, the burners 13′, 14′ and 16″, are put in operation and the face of the sill 7 is bathed in flame and is raised to a high heat. As the glass begins to flow the guide 38 is adjusted so that the pocket 39 is directly under the aperture 5 and the glass strikes this pocket and is deflected over the edge of the mold table 35. When the glass has been heated sufficiently to allow it to flow readily from the furnace the guide 38 is adjusted so that pocket 40 is directly under the aperture 5. The mold table 35, plunger 41 and cutting gate 21 are then put in operation, and the movement of each, which is preferably intermittent, is so timed that the table 35 is halted with a mold 36 below the aperture 5, the gate 21 descends and cuts off a given quantity of glass, while at the same time the plunger descends and operates on the mold 36 halted directly under it, and which has previously been filled with glass. The gate 21 arrests the flow of the glass from the furnace momentarily, and in the meantime another mold is being moved into position beneath the pocket 40 of the guide 38 and aperture 5 to receive another quantity of glass.

The movement of the gate 21 upon the charge of glass is as follows:

As the gate 21 rises to its highest position the glass bulges forth and downward from the aperture 5. The gate then descends somewhat slowly pushing the charge of glass ahead of it, as is shown in Fig. 6, until its cutting edge reaches the upper edge of the cutting sill 7 when its movement is accelerated so that it moves very quickly until its edge reaches the lower edge of the cutting sill, as is shown in Fig. 7. The edge of the knife is cold (being water cooled), and the edge of the cutting sill is hot, so that the glass will not adhere to either. The charge therefore falls freely through the guiding pocket 40 into the mold.

The ware produced by my device is remarkably free from defects since the glass falls directly from the furnace mouth into the mold 35, which gives a hot and homogeneous quantity of glass to be operated upon by the plunger 41. Caps, liners, bottles, jars and globes, etc., can consequently be made by my device with great rapidity and efficiency.

It is obvious that many changes in my device may be made by those skilled in the art, without departing from my invention, since what I claim is:

1. In an apparatus for delivering molten glass from a furnace or the like, the combination of a delivery spout; a knife movable across the mouth of the same; means for cooling said knife; a refractory cutting sill at one side of the mouth of the spout with which the knife coöperates to effect the final severance of the charge being delivered; and means, independent of the molten glass, for maintaining said cutting sill in a heated condition, whereby the charge will be directly separated from the bulk in the furnace without being chilled, and the glass will be prevented from sticking to the knife and cutting sill.

2. In an apparatus for delivering molten glass from a furnace or the like, the combination of a delivery spout having a plane face and a refractory cutting edge at one side of the spout-opening; means, other than the heat of the glass, for maintaining said edge in a heated condition; a knife working against the plane face and adapted to contact with said refractory cutting edge; and means for keeping the edge of said knife cool.

3. In an apparatus for delivering molten glass from a furnace or the like, a delivery spout in direct communication with the furnace, said spout having its face inclined inwardly toward its lower end; and a reciprocating knife positioned on said face and adapted as it is moved downwardly to sever a charge of glass flowing from the spout and to close the spout.

4. In an apparatus for delivering molten glass from a furnace or the like, the combination of a delivery spout, the mouth whereof inclines rearwardly toward its lower end; a knife working over said spout and serving, as it is moved downwardly, to cut the stream of glass flowing from the spout; and a mold located beneath the spout and adapted to directly receive the charge of glass severed by said knife.

5. In an apparatus for delivering molten glass from a furnace or the like, the combination of a delivery spout, the mouth whereof inclines rearwardly toward its lower end or sill; means for heating said sill; a knife working over said mouth and contacting, when closed, with the sill; and means for cooling the knife.

6. In an apparatus for delivering molten glass from a furnace or the like, the combination of a delivery spout, the mouth whereof inclines rearwardly toward its lower end; a knife working over said spout and serving, as it is moved downwardly, to cut the stream of glass flowing therefrom; and means for moving the knife, the speed of the knife accelerating as it nears the limit of its cutting movement.

7. In an apparatus for delivering molten glass from a furnace or the like, the combination of a delivery spout; a knife movable across the mouth of the same; means for cooling said knife; a clay cutting sill located at the lower portion of the mouth of the spout and with which the knife coöperates to effect the final severance of the charge being delivered; and means, independent of the molten glass, for maintaining such cutting sill in a heated condition, whereby the charge will be directly separated from the bulk in the furnace without being chilled, and the glass will be prevented from sticking to the knife and the cutting sill.

8. In an apparatus for delivering molten glass from a furnace or the like, the combination of a delivery spout the mouth whereof inclines rearwardly toward its lower end; a knife movable across the mouth of the same; means for cooling said knife; and a clay cutting sill located at the lower portion of the mouth of the spout and with which the knife coöperates to effect the final severance of the charge being delivered; and means, independent of the molten glass for maintaining said clay sill in a heated condition, whereby the charge will be directly separated from the bulk in the furnace without being chilled and the glass will be prevented from sticking to the knife and the cutting sill.

9. In an apparatus for delivering molten glass from a furnace or the like, the combination of a delivery spout the mouth whereof inclines rearwardly toward its lower end; a clay sill located at the lower portion of said mouth; means for bathing said sill in flame and thereby maintaining it in a heated condition at all times; a knife working across the spout and adapted to coöperate with the sill to effect a severance of the charge of glass being delivered; means for maintaining said knife in a cool condition; and means for moving the knife, the speed of the knife accelerating as it passes the sill.

10. In an apparatus for delivering molten glass from a furnace or the like, the combination of a delivery spout the mouth whereof inclines rearwardly toward its lower end; a clay sill located at the lower portion of said mouth; means for bathing said sill in flame and thereby maintaining it in a heated condition at all times; a knife working across the spout and adapted to coöperate with the sill to effect a severance of the charge of glass being delivered; and means for maintaining said knife in a cool condition.

11. In an apparatus for delivering molten glass from a furnace or the like, the combination of a delivery spout, the mouth whereof inclines rearwardly toward its lower end; a knife working over said spout and serving, as it is moved downwardly, to cut the stream of glass flowing from the spout; a mold located beneath the spout and adapted to directly receive the charge of glass severed by the knife; and a guide for the severed charge interposed between the spout and mold, said guide being provided with a deflecting pocket adapted to be positioned between the mold and spout to deflect the severed glass away from the mold as and for the purpose described.

12. In an apparatus for delivering molten glass from a furnace or the like, the combination of a delivery spout; a knife working over said spout and serving, as it is moved downwardly, to cut the stream of glass flowing from the spout; a mold located beneath the spout and adapted to directly receive the charge of glass severed by the knife; and a guide for the severed charge, interposed between the spout and mold, said guide being provided with a deflecting pocket adapted to be positioned between the mold and spout to deflect the severed glass away from the mold, as and for the purpose described.

13. In an apparatus for delivering molten glass from a furnace or the like, the combination of a delivery spout; a knife working over said spout and serving, as it is moved downwardly, to cut the stream of glass flowing from the spout; a mold located beneath the spout and adapted to directly receive the charge of glass severed by the knife; and a laterally adjustable guide for the severed charge interposed between the spout and mold, said guide being provided with a charge centering opening or pocket, and a lateral charge deflecting pocket, as and for the purpose described.

14. In an apparatus for delivering molten glass from a furnace, the combination of a spout; a fixed face plate having a flow opening therein; clay side faces and a cutting sill interposed between said plate and spout; burner blocks located adjacent said sill, a burner case pivotally supported at its rear end; and detachable connections between the forward end of said case and the face plate.

15. In an apparatus for delivering molten glass from a furnace, the combination of a spout; a removable clay extension or mouth for said spout having a delivery opening with a cutting sill at its lower side; a knife adapted to coact with said sill; pivoted supporting means for said sill; and means for normally sustaining said supporting means and consequently the sill in place.

16. In an apparatus for delivering molten glass from a furnace, the combination of a spout; a removable clay extension or mouth therefor; a face plate; burner blocks located adjacent the lower portion of the mouth; a pivoted burner supporting member; and detachable connections between said supporting member and the face plate.

ROBERT GOOD, Jr.

Witnesses:
HELEN A. PARKER,
LOUISE BATES.